United States Patent
Eyberg et al.

(10) Patent No.: US 12,413,556 B1
(45) Date of Patent: Sep. 9, 2025

(54) UNIKERNEL VPN GATEWAY

(71) Applicant: NanoVMs, Inc., San Francisco, CA (US)

(72) Inventors: Ian Eyberg, Oakland, CA (US); William Yongwoo Jhun, Tuckahoe, NY (US); Justin Sanders, Athens, GA (US)

(73) Assignee: NanoVMs, Inc., San Francisco, CA (US)

( * ) Notice: Subject to any disclaimer, the term of this patent is extended or adjusted under 35 U.S.C. 154(b) by 298 days.

(21) Appl. No.: 17/941,375

(22) Filed: Sep. 9, 2022

Related U.S. Application Data (60) Provisional application No. 63/243,001, filed on Sep. 10, 2021.

(51) Int. Cl.
*H04L 9/40* (2022.01)
*G06F 9/455* (2018.01)
*H04L 12/66* (2006.01)

(52) U.S. Cl.
CPC ...... *H04L 63/0272* (2013.01); *G06F 9/45558* (2013.01); *H04L 12/66* (2013.01); *G06F 2009/45595* (2013.01)

(58) Field of Classification Search
CPC . H04L 63/0272; H04L 12/66; G06F 9/45558; G06F 2009/45595
See application file for complete search history.

(56) References Cited

U.S. PATENT DOCUMENTS

| | | | |
|---|---|---|---|
| 9,712,386 B1* | 7/2017 | Chen | H04L 41/12 |
| 2014/0282542 A1* | 9/2014 | Smith | H04L 49/70 |
| | | | 718/1 |
| 2019/0238457 A1* | 8/2019 | T | H04L 45/04 |
| 2020/0099725 A1* | 3/2020 | Noldus | H04L 65/1016 |

OTHER PUBLICATIONS

Madhavapeddy, Anil "Improving Docker with Unikernels: Introducing HyperKit, VPNKit and DataKit" May 18, 2016 [retrieved on Oct. 7, 2024]. Retrieved from the internet: <URL: https://www.docker.com/blog/docker-unikernels-open-source/> (Year: 2016).*

* cited by examiner

*Primary Examiner* — Hany S. Gadalla
(74) *Attorney, Agent, or Firm* — Van Pelt, Yi & James LLP (57) ABSTRACT

Deploying a unikernel VPN gateway includes implementing a VPN gateway on a virtual machine as a unikernel. The virtual machine is instantiated with properties that enable the VPN gateway to enable interaction of a client with a private network.

16 Claims, 3 Drawing Sheets

UNIKERNEL VPN GATEWAY

CROSS REFERENCE TO OTHER APPLICATIONS

This application claims priority to U.S. Provisional Patent Application No. 63/243,001 entitled UNIKERNEL VPN GATEWAY filed Sep. 10, 2021 which is incorporated herein by reference for all purposes.

BACKGROUND OF THE INVENTION

The use of VPNs has continued to increase, especially as remote work has increased. Given the increase in amount of VPN traffic and the potentially sensitive nature of the information on the private networks that the VPN gateways facilitate access to, it would be beneficial to have more efficient and secure VPN gateways.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

VPN (virtual private network) gateways allow remote users to access, over a public network, the resources of a private network as if the user's remote devices were directly connected to the private network. For example, suppose that a remote worker is using their work laptop at home, and would like to access an internal network of their company (versus an external network that is public facing). A VPN gateway facilitates such access, and also provides various benefits. For example, there might not be only one host or service that the user would like to access internally. There may be many different services that the user may want to access.

The following is an example of provisioning a VPN. Suppose an ops or admin user would like to give other developers on their team access to an internal database that hosts a company's website. The operator installs a VPN gateway to access the network. The end developers are able to access, via their VPN clients, that database that is typically not exposed to the Internet or public network. That is, the end developer may use their client device, such as their laptop, and have direct access to the private network that they have been granted access to, because they are a part of that private network.

Suppose that the company is hosting their resources on a cloud provider such as Amazon Web Services (AWS) or Google Cloud. In order to implement the VPN gateway, the operator goes to AWS and spins up a VM (virtual machine) server, on which a VPN gateway such as OpenVPN, WireGuard, etc. is installed.

Traditionally, a full virtualized computing server, such as a Linux, Ubuntu, or Debian instance is spun up. This poses several security risks. For example, the server on which the VPN gateway is installed will be exposed to the Internet, at least on the ports that the VPN gateway is listening on. From a security standpoint, if an attacker were to find a vulnerability in Open VPN or WireGuard, then the nefarious entity would have access to the VPN server, which in the case of traditional systems, is a full computing environment (e.g., a VM instance running a general-purpose operating system such as Linux), on which the attacker can perform lateral attacks. In this case, the attacker would not only have compromised the VPN server/gateway, but would also have access to all other servers and resources within that protected environment. For example, because of access to a full computing environment (running a general-purpose operating system (OS)), the attacker could shell into the server, download new compilers, new scripts, enumerate various different hosts on the network, perform a survey of the protected environment, etc. That is, with access to the full computing environments that are typically used to host a VPN gateway, a nefarious entity would easily be able to perform a multitude of attacks.

Described herein are embodiments of a unikernel VPN gateway. Using embodiments of the unikernel VPN gateway described herein, the aforementioned security issues with traditional VPN gateways are addressed.

In various embodiments, unikernels are machine images that are single process, cannot be ssh-ed (secure shelled) into, and include only those parts of an operating system that are needed for the process to run. With a unikernel, an application is combined with only those portions of an operating system that are needed to form a unikernel machine image. The deployed unikernel may then be run and booted into on a virtual machine (VM) hypervisor or on bare metal, without a host or underlying operating system.

The use of unikernel machine images provides various efficiency and security benefits.

For example, with respect to security benefits, in the case of the unikernel environment, where a unikernel is only permitted to run a single program (e.g., VPN gateway program), attackers are unable to rely on traditional tools to perform the aforementioned enumeration and exploration that would be possible in traditional full computing VPN servers that were compromised. For example, even if access to the unikernel VM on which the VPN gateway were installed were compromised, the nefarious entity would not be able to perform updates, install various tools, download compilers, or make new software. With a unikernel-implemented VPN gateway server, attackers are limited to whatever they are able to place in an exploit payload, and are unable to spawn shells or implement shell code in the unikernel VM. It would be highly challenging for an attacker to implement any program on the unikernel VM. For example, while on a Linux or Windows or Mac-based VPN gateway, an attacker would have the capability to load up arbitrary binaries and run them, this is not permitted in a unikernel. Attempts to exploit the unikernel would be challenging for users, requiring new forms of logic, such as using gadgets to take a series of instructions that are inside the program that is being exploited, having them jump to and/or overwrite addresses, etc. Even if such gadgets were used, it would be difficult to use them to generate an end program such as NMAP to enumerate a host's layout in the private network.

The use of unikernels to implement VPN gateways also provides various computing performance and efficiency benefits. For example, a typical DevOps user, to deploy a VPN gateway such as OpenVM or WireGuard using traditional techniques, spins up a Ubuntu or Debian VM instance. Without having installed an application, there will already be a large number (e.g., several hundreds) of processes running on that instance (which is running a general-purpose operating system environment). A VPN gateway typically requires minimal resources, so in this example, suppose the DevOps user chooses a small-sized instance (e.g., EC2 small instance type on AWS). An EC2 small instance type has only one actual thread and would have difficulty running all these processes. This results in a performance tax that is dealt when context switching among all the different processes (some of which are not necessary to the functioning of the VPN gateway). Thus, there are various context switch performance costs, whether it is from kernel space to user space, from process-to-process, or from thread-to-thread.

The use of unikernels, which are single process, eliminates such context switching. Rather, in the case of networking, the unikernel VPN gateway instance may be built to only include those portions of an operating system (e.g., network stack) needed to run the VPN gateway. For example, when using a VM with a full, general-purpose operating system (OS), the OS will include various features that are not necessarily relevant to VPN functionality. On the other hand, with a unikernel, a much smaller network stack specific to VPN functionality may be included in the unikernel machine image when it is built.

By being focused and only including the minimal components needed for the single process application to run, the average size of the unikernel VM instance may be much smaller than that of a typical implementation of a VPN gateway being run on a traditional operating system. This enhanced focus on running networking improves performance, as the unikernel does not have to time slice against any other processes on the system (which would be the case for traditional VPN gateway implementations running in VM instances that have full operating systems). For example, if a VPN gateway were spun up on a Ubuntu instance on Google Cloud, there would already be a Python daemon installed that would be stealing time every few seconds to report on metrics and ping an internal service. The Ubuntu instance would include many such processes by default, which need not be included in a unikernel VM instance. In this way, the unikernel implemented VPN gateway gains more performance by not having time being stolen to perform extraneous or unnecessary processes. Further, the use of unikernel VPN gateways allows for improved performance at scale, where more communications (such as for Internet video conferencing) may be routed through the VPN using the same amount of instances.

The smaller footprint of a unikernel-based VPN gateway (VPN gateway running on a unikernel, rather than general purpose operating system) not only provides the aforementioned performance benefits, but also provides security benefits as described above. For example, the smaller footprint of the unikernel-based VPN gateway results in a reduced attack surface, as there is not on an assortment of utilities on the system image.

Figure 1:
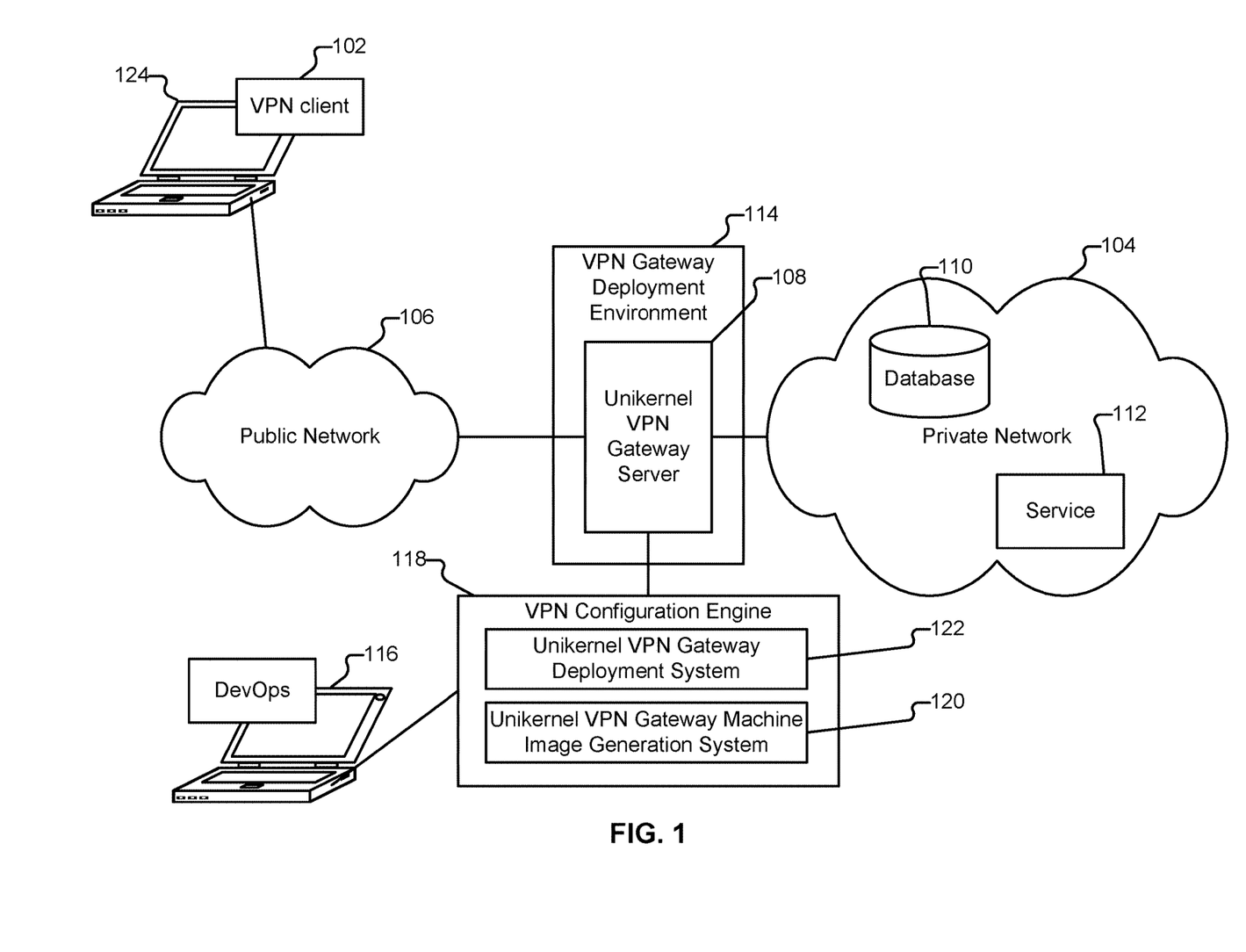
FIG. 1 illustrates an embodiment of a network including a unikernel VPN gateway.

FIG. 1 illustrates an embodiment of a network including a unikernel VPN gateway. In this example, a remote user is operating their laptop 124. The user would like to connect to their company's private network 104 so that they can access corporate resources such as database 110 (e.g., internal database that hosts the company's website) and service 112. The laptop has installed a VPN client 102. The laptop is connected to a network 106, which, as one example, is their Internet Provider's network. The VPN client is configured to determine where to send various requests made by the user. For example, if the user would like to access a resource on the private corporate network, the request is routed through the VPN gateway 108. The VPN gateway then determines where to route requests in the private network. As one example, the company's private network is being hosted on a service such as Amazon Web Services (AWS) or Google Cloud. The VPN gateway is also deployed in such a cloud environment 114 to facilitate access (e.g., to end developers) to the hosted corporate network. The VPN gateway is implemented as a server that listens on various ports to the Internet for requests that are directed to it. In this example, the VPN gateway is implemented as a unikernel.

In this example, a DevOps user uses their device 116 to spin up or deploy a unikernel VM instance running the VPN gateway using VPN configuration engine 118. As one example, unikernel VPN gateway machine image generation system 120 is configured to generate a unikernel machine image that includes the VPN gateway server application (e.g., OpenVPN or WireGuard), as well as any portions of an operating system needed to support the VPN gateway application. Further, any network functionality and configuration of the settings of the network functionality are built into the generated unikernel machine image. Here, the unikernel machine image is generated according to the configuration by the DevOps users. In this example, the unikernel VPN gateway is deployed by providing the generated unikernel machine image to unikernel VPN gateway deployment system 122, which is configured to instantiate a unikernel virtual machine (VM) instance using the unikernel machine image. Portions of VPN configuration engine 118 may reside in different entities in various embodiments. As one example, the unikernel VPN gateway deployment system is implemented in the environment in which the VPN gateway is deployed. The unikernel VPN gateway machine image generation system may be implemented on the local device 116 of the DevOps user, where unikernel images generated locally are then uploaded to the deployment environment. As another example, the machine image generation system is also implemented in the cloud, where the user may use a configuration interface (e.g., web interface) to specify the configuration settings for the machine image to be built.

When using a traditional VM running a full operating system such as Linux, users have the option to modify the configuration of the VM instance after instantiation and deployment. This is typically not the case for unikernels, which are difficult to modify after deployment. That is, there are differences in deploying and updating the network configuration for unikernel VPN gateways as compared to traditional VPN gateway applications running on full operating systems. Described herein are embodiments of techniques for configuration and modification of unikernel VPN gateways.

For example, consider a traditional VPN gateway running on a VM running a full, general-purpose operating system, such as Linux. In this case, suppose that an operator needs a tunnel device that is not already present on the VM that is currently running, at runtime. In this traditional case, the user can insert the desired module and use it immediately. In the case of a unikernel, such functionality is built into the machine itself at build time. For example, the DevOps user explicitly indicates at build time what functionality is to be included in the unikernel VM, versus when the VM is running. For example, if there any limitations of a cloud provider that are anticipated, then this is accounted for in configuration of the unikernel machine image at build time. For example, consider maximum transmission unit (MTU), which is the maximum frame size that can be sent on a network. Typically on a connection such as Ethernet, an MTU of 1500 is standard and expected, and systems are often configured with the 1500 MTU frame size by default, assuming that there are actual Ethernet frames being communicated on a wire. However, due to various reasons, such as the type of encapsulation being used, the MTU may be lower on a cloud provider. For configuring unikernel VMs on such a cloud, configuration of a lower MTU is included in the configuration of the unikernel machine image at build time. This is an example of configuring functionality of the virtual machine (on which the unikernel VPN gateway is run) to compensate for a characteristic of a cloud provider.

Another example of network functionality that may be configured at build time is IP masquerading. IP masquerading is similar to network address translation (NAT). With respect to VPN gateways, a client communicates with the VPN server, sending encrypted packets. In the case of a unikernel environment, such as that described herein, the unikernel VPN gateway receives the packets, which are processed by the user program, which for example, is a VPN server software such as a WireGuard server. The WireGuard server decrypts the packet, and then places the packet out onto the internal network. One issue is that the source packet traverses various networks. The source packet will have an IP address from a public source—that is, a public-facing IP address. The public IP address should not be put onto the internal network. One way to address this is to turn on IP forwarding, which allows the system to place packets from one network onto another network.

This can be skipped by including IP masquerading functionality in the unikernel machine image at build time. The IP masquerading functionality is configured to rewrite the source IP address and port with a different one of the system's choosing, put the modified packet out onto the network, and any replies will be rewritten again to the original source's IP address and port. In this way, the unikernel server maintains a table of IP addresses/ports on one side, and on the other side, the rewritten IP addresses/ports for the internal network (which is, for example, LAN (local area network) traffic within a single subnet). That is, the IP masquerading includes a table of translation addresses that map source IP addresses/ports to destination IP addresses/ports. The VPN gateway server is configured to convert traffic from a destination client, where a private network then sends a reply. The reply will be returned to the VPN gateway, which then performs a rewrite using the original source address (thereby facilitating a form of network address translation via a translation table).

This prevents requests that originated outside of the private network from being rejected when placed on the internal network. Here, IP masquerading rewrites the original IP address into, for example, the local destination's subnet.

In some embodiments, the IP masquerading is implemented as kernel functionality of the unikernel. For example, the IP masquerading functionality is included as network stack functionality of the kernel, and the unikernel machine image is generated with the IP masquerading functionality included at build time.

As shown above, IP masquerading allows for rewriting of IP addresses, and such functionality may be included/enabled when building the unikernel machine image. If IP masquerading were not used, then in some embodiments IP forwarding is enabled at the cloud's VLAN (virtual local area network) configuration, or for the unikernel VM instance in order for the cloud VLAN to accept packets from different networks.

In some embodiments, such as in the case of a WireGuard implementation, IP forwarding is enabled at image build time for the unikernel VM instance to allow proper routing. For example, if the network stack is running at the kernel level, then functions such as the tunnel device are implemented as plugins or kernel libraries (also referred to herein as "klibs") and included in the network stack at the kernel level as part of the unikernel VM. For example, a tunnel interface klib is included in the unikernel machine image. In some embodiments, the tunnel interface simulates a layer 3 device to facilitate routing. For example, when an end user opens their VPN client on their laptop, the laptop will be connected to at least one network (such as their Internet Service Provider's (ISP's) network). The use of the VPN provides another additional network that the computing device can join. On the client side, the VPN client facilitates the determination of which way to route various resource requests from the client. For example, if the user wishes to access a resource on their corporate private network, then the VPN client will route the request through the VPN gateway. On the server/gateway side, the gateway includes logic for determining where to route requests, as the virtual machine on which the gateway is running will have its own internal network, where the private network is also added. The tunnel interface klib and IP forwarding described above (and that are included in the unikernel machine image at build time) facilitate the routing of requests on the VPN gateway side.

In the case of a unikernel, features such as IP forwarding and tunneling, if needed, are added to the network stack and included in the unikernel machine image at build time.

In some embodiments, any features needed for the unikernel VM instance are included at build time so that they are available upon instantiation of a virtual machine using the unikernel machine image. For example, desired network functionality, such as the ability to route and move packets between interfaces, the aforementioned tunnel klibs (which may be required to provide the user process with access to network interfaces that can be used for receiving and then encrypting and sending information or sending packets to different networks) are included in the network stack of the unikernel machine image at build time.

While the unikernel VPN gateway provides the same functionality as a traditional VPN gateway, as shown above, the deployment/configuration of the VPN gateway using unikernels is different from if a traditional VM were used to implement the VPN gateway.

As another example, returning to the example of a WireGuard implementation, WireGuard configuration takes place through a UNIX socket. For example, the application is written assuming that it will be running in a multi-process environment and that there is a daemon that is running the application and that acts as an interface, where communication may be performed using domain sockets. For example, one half of a UNIX domain socket at a particular path is opened. To configure the VM instance running WireGuard, a second process is opened at the other end of the socket, and commands are issued to the WireGuard instance to configure it with various network configuration information. That is, a second process is required for configuration. This is allowed in traditional VPN gateway implementations where a VM instance is running a general-purpose operating system that allows a multi-process environment. This is not the case for unikernels, which are single process. In some embodiments, to allow configuration, the WireGuard process running on the unikernel VPN gateway is modified to be able to handle configuration in an alternative way.

As one example, for a WireGuard-based unikernel VPN, the VPN gateway software is patched to allow loading of configurations from a file. This provides one example of an expedient way of dealing with the aforementioned problem of not being able to configure the gateway through a client.

As another example, client functionality for configuring the VPN gateway is run on another, separate virtual machine (either a unikernel VM or a VM running a general purpose operating system), where the communication of configuration information to the VPN gateway on the unikernel VM server, rather than happening over a Unix domain socket, is performed over an internal net VPC (virtual private cloud). For example, the unikernel VM that is running the VPN gateway is adapted or otherwise configured to accept TCP connections on a private network. The client side, to configure and drive the VPN gateway, is run from the separate VM instance that is reachable on the same network.

One benefit of this approach is that this provides all of the ability to perform configuration, just as if with a full Linux system, but also provides improved separation between the control and data plane. For example, because these processes are not running on the same VM, there is greater isolation between the control and data plane.

As described above, the aforementioned techniques provide adaptations for unikernels when there are multi-process resolutions for an application. The aforementioned techniques may be used in a unikernel environment, and avoid the issues associated with configuration that is dependent on, for example, Unix domain sockets. In some embodiments, in the example approaches described above, the daemon itself and the client that is controlling the daemon and performing the configuration, monitoring, etc. are adapted to communicate over, for example, a TCP (Transmission Control Protocol) connection, over an internal network, a VPC (virtual private cloud), etc. This provides the benefit of improved isolation. For example, even if the client program or whatever is performing the configuration and maintenance is more exposed to an environment, such as a DevOps environment, the data plane (which is carrying potentially sensitive user information) remains more isolated and better protected, because the control plane and data plane are running in separate VMs.

As described above, one way to perform the configuration while the VM instance (on which the VPN gateway is executing) is running is to implement a network connection, via which configuration information can be parsed dynamically, while the VM instance is running.

If such remote connections are not available, in an alternative embodiment, updates to network configuration are implemented by introducing the changes in a new unikernel machine image and redeploying the unikernel VPN gateway on a new unikernel VM instance.

For example, in some embodiments, in a unikernel, performing configuration of a user program running in a unikernel may be performed via a file that is on the local VM's boot hard drive. In the case of a Linux-based VM, a configuration change may be implemented by shelling into the Linux VM and using an editor to modify the configuration file, where the process is then restarted. This is not available for a unikernel VM instance, as there is no access to a shell, and it is difficult to modify files on the disk.

In the case of a unikernel VPN gateway, if a change to the network configuration of, for example, the tunneling server (VPN gateway) were to be made, and the configuration is done via a file, the change is not done at the currently running VM instance (as the unikernel VM cannot be modified from within). Instead, in various embodiments, the change is implemented in a new unikernel machine image that is built (that also includes the VPN gateway server software application), where the new image with the updated configuration is deployed (where the VPN gateway is, for example, redeployed).

The following are embodiments of modifying or updating a unikernel VPN gateway running in a VM. As described above, it can be difficult to modify a unikernel VM instance at runtime, while it is running. As described above, if certain functionality is desired for a unikernel VPN gateway, it is included in the machine image at build time, prior to deployment in a VM. Some types of functionality may be enabled or disabled. In some embodiments, in addition to including desired network functionality at build time of the unikernel machine image, the state of included functionality is also set at build time (e.g., having functionality enabled or disabled). However, suppose that a DevOps user wishes to change the state of the functionality after deployment of the unikernel VPN gateway.

The following are embodiments of modifying or updating the state of network functionality of a unikernel VPN gateway. Using the techniques described herein, unikernel VPN gateways may be updated without downtime.

As one example, debug functionality may be desired or anticipated to be desired by a DevOps user. In this case, the DevOps user anticipates the type of the facilities or tools that will be needed to debug problems. While in a Linux environment (or any other environment in which general purpose operating systems are used), there are a wide array of utilities that can be drawn from, where additional features may even be downloaded and actively installed (e.g., via apt get) and compiled for use immediately while the gateway is running and without bringing it down, such possibilities are not available for unikernels. In the following example, a unikernel VPN gateway is updated to introduce debugging functionality.

Suppose that in this example, the DevOps user anticipates the use of the TCPdump tool. When building the unikernel machine image including the VPN gateway server software, the DevOps user incorporates the TCPdump functionality into the image (where the TCP dump functionality is built into the unikernel machine image and is available). However, running the debugging tool may cause a performance tax, and while the debug tool functionality is included in the unikernel machine image, the DevOps disables the functionality in it is initial configuration. In this case, a debug-disabled machine image is created and deployed initially.

In some embodiments, selecting of what features to include in a unikernel machine image, and configuration of the state of the functionality is facilitated via a management interface in which various available tools are presented. In some embodiments, the management interface is run locally on a developer's laptop. In other embodiments, the management interface is deployed in a selected cloud. Further details regarding a unikernel management interface are described below. The builder the unikernel VPN gateway may then select which tools to include in the unikernel machine image being built (e.g., by toggling on/off a selection, or using any other type of UI control or input, as appropriate), as well as the state of the tool if applicable (e.g., by toggling on/off whether a function is enabled or disabled during deployment).

Now suppose that after the debug-disabled VPN gateway has been running for some time, the DevOps user would like to enable debugging. For example, suppose that the unikernel VPN gateway has been running, and it is observed that some packets are not being routed to the correct network, or that traffic cannot be routed from one instance to another instance. To investigate, the DevOps user would like to turn on TCPdump. In a traditional VPN gateway running on a general purpose OS (which may in turn be running on a VM), a user could simply remotely access the VM instance on which the VPN gateway is running (e.g., via SSH) and enable the debugging tool from within the VM. This is not the case for unikernels.

For example, if the TCPdump functionality had been included in the unikernel VPN gateway instance, but had been turned off (to avoid a performance penalty, as described above), because there is typically not the capability of interacting with unikernel systems, the unikernel VPN gateway cannot be accessed from within the VM to turn the TCPdump functionality on. For example, in the case of a unikernel-based VPN gateway, shelling into the unikernel is not allowed. In some embodiments, to facilitate the enabling of the debug feature, a second, debug-enabled image is built and deployed. As shown in this example, in some embodiments, to change the configuration of the system, a fresh deployment is performed. That is, to change the state of some functionality to a different state, a different instance of the VPN gateway is generated and deployed. This is in contrast to an environment using general purpose OSes, in which the changing of state of functionality may be performed live, without requiring a new VM instance to be created.

In this example, the DevOps user uses the management interface (e.g., web-based graphical user interface) to toggle on/off functionality. Based on the indication from the user to update the state of a functionality of the unikernel VPN gateway, a fresh deployment of the unikernel VPN gateway with the TCPdump functionality enabled is orchestrated.

By implementing changes to the unikernel VPN gateway via redeployments, the ability to enable/disable functionality is provided in a manner that also minimizes security risks.

As shown the above examples, as SSH-ing into a running unikernel instance is not allowed (and a binary cannot be copied and then run) for security purposes, in some embodiments, adding functionality to the VPN gateway includes generating a new VPN gateway instance. In this case, there will be a new unikernel VPN gateway to process traffic. In some embodiments, re-orchestration is performed to handover or transfer traffic processing from the existing unikernel VPN gateway to the new unikernel VPN gateway. The transfer may occur in different ways depending on whether there is a single unikernel VPN gateway node operating, or whether there are multiple unikernel VPN gateway nodes (each running in their own respective unikernel VMs) operating behind a load balancer.

Suppose that there is a single VM instance running a VPN gateway. In some embodiments, orchestration of the updated unikernel machine images with added functionality is performed to switch over VPN functions from the existing debug-disabled image to the new debug-enabled image. For example, when deploying the new unikernel VPN gateway, network traffic is redirected from the existing VPN gateway to the new unikernel VPN gateway. In some embodiments, the redirection is performed by utilizing a DNS server and switching over the CNAME. In some embodiments, an update to DNS (Domain Name System) is performed when conducting the switch over. A low TTL may also be set to allow for quick updates. In this way, no downtime is experienced when updating functionality. For example, the CNAME stays the same with a small TTL, but the IP address that the CNAME points to switches over (from the IP address of the debug-disabled unikernel VM instance, to the IP address of the debug-enabled unikernel VM instance). This allows other services to continue to the use service in question without knowing the new IP address. In some embodiments, after the switch over is complete, the previous debug-disabled unikernel VM instance is spun down or destroyed.

As another example, if DNS is not being used, elastic IP (Internet Protocol) address may be used. The elastic IP may be switched over from the existing unikernel VPN gateway to the new unikernel VPN gateway. This is an example of a feature of public clouds where there is an IP address that is treated as DNS, but is static, where the elastic IP is switched from instance to instance. As with the above switch over, no downtime is experienced when instantiating the new unikernel VPN gateway with the updated configuration/functionality.

In other cases, there may be multiple VM instances running multiple VPN gateways that have been instantiated to take in web traffic, all of which are behind a load balancer. In this case, the new debug-enabled VPN gateway may be deployed without requiring a switch over process. For example, from a debugging perspective, a unikernel VPN gateway with TCP dump included/enabled is spun up behind the load balancer. As it is on the same network as other VM instances, debugging of traffic on the network would still occur. In this multi-node example, as there will be a load balancer (or auto-scaling of groups may be in effect), a new unikernel VPN gateway with the desired functionality included/enabled may be deployed. Other VPN gateways need not be spun down in this case. Explicit redirection also need not be performed. Using the techniques described herein, no downtime of the VPN gateway service is experienced when updating functionality or features of a unikernel VPN gateway.

As described above, running a function such as TCP dump will result in a performance hit on the system (whether running a general purpose operating system or a unikernel). Because of this, the DevOps user may wish to disable the TCP dump functionality after using it, to avoid the performance penalty. In this example, after the Ops user has spun up the instance with TCP dump enabled, and analyzed/debugged the traffic, the user may disable the functionality (e.g., via inputs to a management interface that provides a graphical user interface (GUI) for point and click functionality), which provides instructions to a hypervisor or the infrastructure of a selected cloud. In some embodiments, in response to the user request to disable TCP dump (e.g., by toggling the functionality off, or indicating the change in a configuration setting or file), a new unikernel machine image is built with the functionality disabled (based on the configuration), and deployed (where a new VM instance is spun up based upon the built image). If the new unikernel VPN gateway is replacing the existing unikernel VPN gateway, traffic is redirected from the existing unikernel VPN gateway to the new unikernel VPN gateway, as described above. The existing or previous unikernel VPN gateway that has TCP dump enabled may then be deleted.

As described above, in a single node example (where there is a single VPN gateway), that single node is redeployed, with a traffic handoff performed as described above. In a load balanced environment, where there are multiple nodes (VPN gateways) handling traffic, the debugging node (VPN gateway with debugging functionality on) may be removed without performing a handoff.

Beyond debugging, redeployment is similarly performed when enabling/disabling (or otherwise modifying the state) of other network functionality as well. For example, the aforementioned IP forwarding and IP masquerading are typically not turned on by default. Thus, while the unikernel machine image may have been built to include such functionality, the sys admin may have decided to have it turned off initially. If the sys admin decides to turn on the functionality after the unikernel VPN gateway is running, the unikernel updating techniques described above are used to deploy a new unikernel machine image with the functionality turned on. If the desired functionality were already included in the existing unikernel machine image, then a copy of the existing unikernel image can be redeployed with the functionality turned on. If the existing disk image did not include the desired functionality, the sys admin may build a new disk image with the desired functionality, and with the functionality enabled/disabled as desired.

Management Interface

As described above, in some embodiments, a management interface is provided to facilitate deployment and configuration of unikernel VPN gateways.

For example, the management interface (e.g., a GUI) may provide toggles via a flag at build time (e.g., to include certain functionality or features or tools in a unikernel machine image to be deployed).

In some embodiments, the management interface may be used to execute higher level orchestration patterns such as those described above, including the (re) deployment of instances with updated functionality, redirection of traffic from existing unikernel VPN gateways to newly deployed VPN gateways, etc. In some embodiments, the management interface is run locally at an end user's device. As another example, the management interface is deployed to the cloud, where the interface communicates via the cloud's API (application programming interface). In this case, the cloud itself is responsible for dealing with the hypervisor. For example, the management interface may include toggles or controls that users may use for enabling or changing the state of functionality at run time (or also to add features not included in existing instances), in response to which the aforementioned higher level orchestration patterns are executed. The orchestration patterns may be customized. For example, some entities may load balance their traffic, while some do not. Some entities may desire debugging functionality, while others may not.

In some embodiments, to make a change, the user may use the management interface to change the configuration of their unikernel VPN gateway. They may also set a configuration setting in a configuration file. The configuration of the unikernel VPN gateway (and the unikernel machine image that includes the VPN gateway application) is then used to build a unikernel machine image. A virtual machine instance is then spun up based upon that unikernel machine image.

In some embodiments, the management interface is implemented using a graphical administration tool. For example, click button support for configuration is provided. Via the graphical administration tool, a user may view, on a display or screen, the various control options, as well as the output of the configuration.

In other embodiments, the user may update the configuration by adding or modifying definitions in a configuration file. For example, to enable IP forwarding, a user adds a define into the configuration file for the network stack to turn IP forwarding on. A customized unikernel machine image is then built, according to the configuration file, with IP forwarding included and enabled in the network stack. The built machine image is then used to spin up a virtual machine instance (where the VM instance is booted up with the unikernel machine image).

The following is an example of using the management interface to enable functionality of a unikernel VPN gateway. In some embodiments, the management interface includes UI (user interface) elements via which the user can provide a user input that is an indication to turn on TCP dump for debugging, IP forwarding, etc. Based on the user selection/configuration, a prebuilt system may be identified, selected, or generated. A unikernel VM instances may then be deployed using the prebuilt image. This eliminates manual configuration/definition. In this way, the user sets their configuration settings (e.g., for whatever functionality or plugins they would like to include/enable) before the image is built (where the image may be built locally). The unikernel machine image is then pushed out and used to create a VM instance. In some embodiments, the deployment/configuration of the unikernel machine image/creation of a VM instance is click-button enabled through the administration tool.

The configuration/building of unikernel machine images may be performed locally at a client device and exported to where it will be deployed (e.g., on a cloud service), or configured via a web interface. As described above, in various embodiments, the configuration of unikernel machine images may be web accessible or via human editing of a configuration file.

The following are further details regarding configuration of unikernel VPN gateways via configuration files. For example, an end developer may build the unikernel machine image on their local machine (e.g., laptop). As one example, the end developer modifies a configuration file, via which they are able to specify various configuration parameters.

The configuration file includes which cloud the unikernel is to be deployed on, what files to include in the disc image, which network configuration parameters to include, etc. Including or excluding of a tunnel interface, for example, may be indicated via a Boolean-type setting. In some embodiments, the user manually edits a JSON (JavaScript Object Notation) file, and types in their settings.

In the above example, a user manually edits a configuration file to their specification. In other embodiments, as described above, the user configures their unikernel via a graphical administration tool, which facilitates easier, UI-based configuration.

The result of the editing/administration tool is a unikernel configuration file. In some embodiments, the configuration file is transformed into a different type of configuration filed referred to herein as a "manifest."

The manifest is stored inside the disc image. When the disk image is being built, the configuration settings are read and used to determine what features (e.g., klibs) are to be included in the unikernel system. The appropriate manifest settings are also set.

In some embodiments, the building of the unikernel machine image is performed locally (e.g., at the end developer's computing device). The end artifact is the unikernel disk image. The disk image is uploaded to a cloud of the end user's choice. In some embodiments, a registration process is performed at the cloud to recognize the disk image as a VM. Once the registration process is complete, a VM instance is spun up or created based upon the unikernel disk image.

As described above, in some embodiments, the unikernel configuration is web accessible. For example, rather than deploying the unikernel from their end device to a cloud, the unikernel is deployed from inside or within the desired infrastructure. For example, if the end user is a sysadmin for a company that is using Google Cloud, the unikernel may be deployed from within Google Cloud, via a web accessible interface (e.g., administration tool described above) for ease of use. For example, the unikernel machine image may be built in the cloud if the end user is uncomfortable building locally, or their internet connection is poor while also having to work with large images (e.g., multi-gigabyte images). In this case, building in the cloud allows for the image to be built on the same network as where the image will be deployed to, with lower latency/higher bandwidth.

As shown in the above examples, updates or modifications to be made to the unikernel VM are indicated externally to the unikernel VM, where the updates involve deployment of a new unikernel VM instance with the requested modifications. This is in contrast to VMs running general purpose operating systems. For example, for a Linux-based system, a user who wishes to make modifications is already authorized to make changes from inside the system (VM). That is, they may enable features from within the VM. This is in contrast to unikernel VMs, where the user such as the sys admin is not able to make changes from within the unikernel VM after the unikernel VM has been deployed. In the case of unikernel VMs, there is a VM isolation layer, where authorization/ownership of that unikernel VM is from outside of the unikernel VM.

Figure 2:
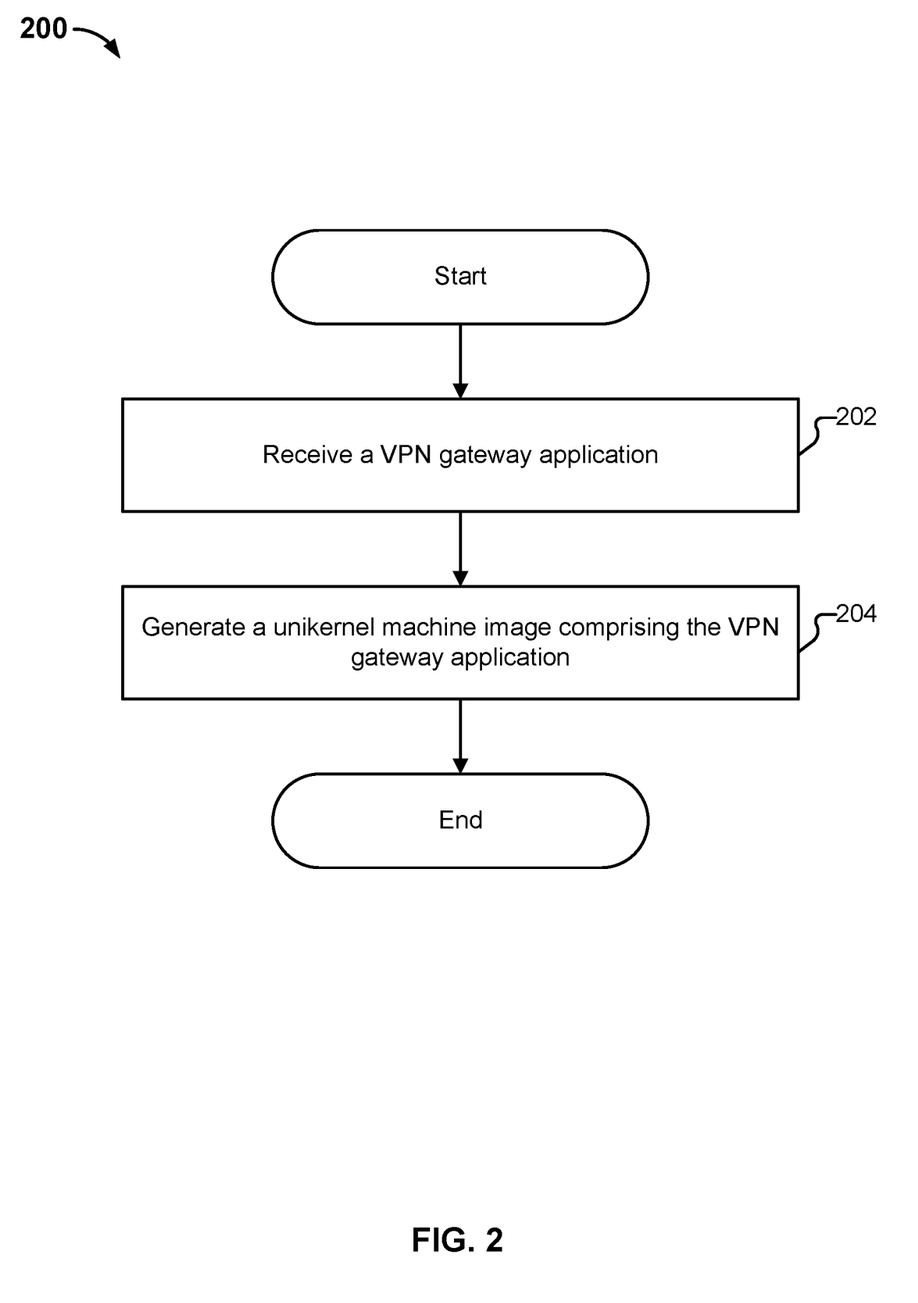
FIG. 2 is a flow diagram illustrating an embodiment of a process for generating a unikernel machine image including a VPN gateway.

FIG. 2 is a flow diagram illustrating an embodiment of a process for generating a unikernel machine image including a VPN gateway. In some embodiments, process 200 is executed by unikernel VPN gateway machine image generation system 120 of FIG. 1. The process begins at 202, when a VPN gateway application is received. At 204, a unikernel machine image comprising the VPN gateway application is generated. In some embodiments, the unikernel machine image is built to include network stack functionality. In some embodiments, a state of the functionality is set at build time.

Figure 3:
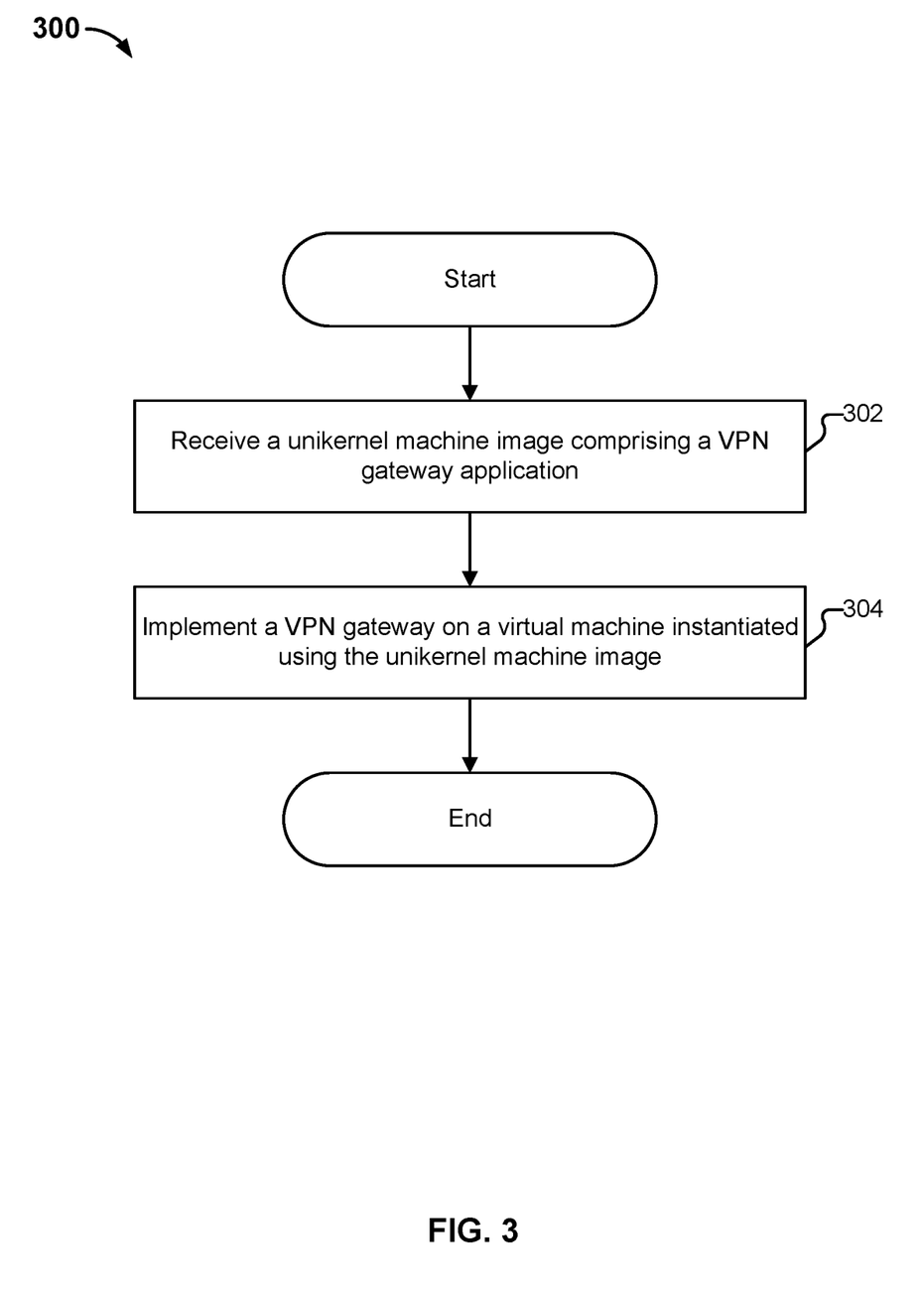
FIG. 3 is a flow diagram illustrating an embodiment of a process for provisioning a unikernel VPN gateway.

FIG. 3 is a flow diagram illustrating an embodiment of a process for provisioning a unikernel VPN gateway. In some embodiments, process 300 is executed by unikernel VPN gateway deployment system 122 of FIG. 1. The process begins at 302, when a unikernel machine image comprising a VPN gateway application is received. For example, the unikernel machine image is generated using process 200 of FIG. 2. At 304, a VPN gateway is implemented on a virtual machine that is instantiated using the unikernel machine image. In some embodiments, the virtual machine is instantiated with properties that enable the VPN gateway to enable interaction of a client with a private network.

The following is an embodiment of instantiating a VPN gateway with network functionality in a first state, and redeploying the VPN gateway with network functionality in a second state.

In some embodiments, a first virtual machine is instantiated based at least in part on a first unikernel machine image, wherein a first VPN gateway is run on the first virtual machine that is instantiated based at least in part on the first unikernel machine image, and wherein the first unikernel machine image is built with a function configured in a first state.

An indication is received of a request to update a state of the function to a second state that is different from the first state. In response to the indication to update the state of the function to the second state, a second virtual machine is instantiated based at least part on a second unikernel machine image, wherein a second VPN gateway is run on the second virtual machine that is instantiated based at least in part on the second unikernel machine image, and wherein the second unikernel machine image is built with the function configured in the second state.

In some embodiments, network traffic is redirected from the first VPN gateway running on the first virtual machine instantiated based at least in part on the first unikernel machine image to the second VPN gateway running on the second virtual machine instantiated based at least in part on the second unikernel machine image.

In some embodiments, the network traffic is redirected at least in part by switching a CNAME. As another example, the network traffic is redirected at least in part by switching an elastic IP (Internet Protocol) address.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A network, comprising:
   an interface to a client device; and
   a first VPN gateway implemented on a first virtual machine as a first unikernel that is run using one or more hardware processors;
   wherein the first virtual machine is instantiated with properties that enable the first VPN gateway to enable interaction of the client device with a private network; and
   wherein a network feature is disabled upon instantiation of the first virtual machine, wherein based at least in part on an indication to enable the network feature, a second VPN gateway is implemented on a second virtual machine as a second unikernel, and wherein the network feature is enabled upon instantiation of the second virtual machine.

2. The network of claim 1, wherein the network feature comprises IP masquerading.

3. The network of claim 1, wherein the network feature comprises IP forwarding.

4. The network of claim 1, wherein the network feature comprises TCP dump.

5. The network of claim 1, wherein traffic is redirected to the second VPN gateway implemented on the second virtual machine.

6. The network of claim 5, wherein the redirection is facilitated at least in part by switching a CNAME (canonical name) over via DNS (Domain Name System).

7. The network of claim 5, wherein the redirection is facilitated at least in part by switching an elastic IP address of the first virtual machine to the second virtual machine.

8. The network of claim 1, wherein the first virtual machine includes functionality to compensate for characteristics of a cloud provider.

9. A method, comprising:
implementing a first VPN gateway on a first virtual machine as a first unikernel;
wherein the first VPN gateway is included in a network comprising an interface to a client;
wherein the first virtual machine is instantiated with properties that enable the first VPN gateway to enable interaction of the client with a private network; and
wherein a network feature is disabled upon instantiation of the first virtual machine, wherein based at least in part on an indication to enable the network feature, a second VPN gateway is implemented on a second virtual machine as a second unikernel, and wherein the network feature is enabled upon instantiation of the second virtual machine.

10. The method of claim 7, wherein the network feature comprises IP masquerading.

11. The method of claim 7, wherein the network feature comprises IP forwarding.

12. The method of claim 7, wherein the network feature comprises TCP dump.

13. The method of claim 7, wherein traffic is redirected to the second VPN gateway implemented on the second virtual machine.

14. The method of claim 13, wherein the redirection is facilitated at least in part by switching a CNAME over via DNS.

15. The method of claim 13, wherein the redirection is facilitated at least in part by switching an elastic IP address of the first virtual machine to the second virtual machine.

16. The method of claim 9, wherein the first virtual machine includes functionality to compensate for characteristics of a cloud provider.

\* \* \* \* \*